US008787004B2

(12) United States Patent
Di Maio et al.

(10) Patent No.: US 8,787,004 B2
(45) Date of Patent: Jul. 22, 2014

(54) MEDIUM VOLTAGE CIRCUIT BREAKER WITH INTEGRATED ELECTRONIC PROTECTION UNIT

(75) Inventors: Luciano Di Maio, Milan (IT); Massimo Bresciani, Villa di Serio (IT)

(73) Assignee: ABB Technology AG, Zurich (CH)

( * ) Notice: Subject to any disclaimer, the term of this patent is extended or adjusted under 35 U.S.C. 154(b) by 374 days.

(21) Appl. No.: 12/937,032

(22) PCT Filed: Mar. 13, 2009

(86) PCT No.: PCT/EP2009/053005
§ 371 (c)(1),
(2), (4) Date: Oct. 8, 2010

(87) PCT Pub. No.: WO2009/124825
PCT Pub. Date: Oct. 15, 2009

(65) Prior Publication Data

US 2011/0031095 A1 Feb. 10, 2011

(30) Foreign Application Priority Data

Apr. 11, 2008 (EP) .................................... 08154438

(51) Int. Cl.

| | |
|---|---|
| ***H02B 1/00*** | (2006.01) |
| ***H02B 1/26*** | (2006.01) |
| ***H02B 1/04*** | (2006.01) |
| ***H01H 1/64*** | (2006.01) |
| ***H01H 71/12*** | (2006.01) |
| ***H01H 71/02*** | (2006.01) |
| *H01H 9/12* | (2006.01) |
| *H01H 9/16* | (2006.01) |

(52) U.S. Cl.
CPC ......... *H01H 71/0228* (2013.01); *H01H 71/123* (2013.01); *H01H 9/12* (2013.01); *H01H 71/4709* (2013.01); *H01H 9/167* (2013.01)
USPC ............ 361/634; 361/601; 361/622; 200/293

(58) Field of Classification Search
USPC ........................... 361/634, 601, 622; 200/293
See application file for complete search history.

(56) References Cited

U.S. PATENT DOCUMENTS 4,281,359 A * 7/1981 Bayer et al. .................. 361/115
4,300,110 A * 11/1981 Bayer et al. ...................... 335/6
(Continued)

FOREIGN PATENT DOCUMENTS

CN 101176177 A 5/2008
EP 0991095 A2 4/2000
(Continued)

OTHER PUBLICATIONS

Notification of the First Office Action, Chinese Patent Application No. 200980112826.4, issued Oct. 10, 2012.

*Primary Examiner* — Bradley Thomas
(74) *Attorney, Agent, or Firm* — Novak Druce Connolly Bove + Quigg LLP

(57) ABSTRACT

A Medium Voltage Circuit Breaker (CB) comprising an electronic protection and control unit having:

a base, fixed to the CB, comprising a main body having fixing means for fixing to the CB, a first side of said main body comprising a confined space including connections to the CB and internal accessories thereof, a second side of said main body comprising a plurality of first power and/or signal connection means;

a removable unit comprising a casing, a first part of said casing hosting one or more Intelligent Electronic Devices, a second part of said casing being removably coupled to said base and comprising a plurality of second power and/or signal connection means connected to said first power and/or signal connection means.

19 Claims, 10 Drawing Sheets

(56) References Cited

U.S. PATENT DOCUMENTS

| | | | | | |
|---|---|---|---|---|---|
| 4,375,022 | A | * | 2/1983 | Daussin et al. | 218/43 |
| 4,622,444 | A | * | 11/1986 | Kandatsu et al. | 200/303 |
| 4,728,914 | A | * | 3/1988 | Morris et al. | 335/6 |
| 4,754,247 | A | * | 6/1988 | Raymont et al. | 335/202 |
| 4,786,885 | A | * | 11/1988 | Morris et al. | 335/202 |
| 4,788,621 | A | * | 11/1988 | Russell et al. | 361/115 |
| 4,794,356 | A | * | 12/1988 | Yu et al. | 335/13 |
| 4,801,906 | A | * | 1/1989 | Morris et al. | 335/17 |
| 4,806,893 | A | * | 2/1989 | Castonguay et al. | 335/20 |
| 4,831,221 | A | * | 5/1989 | Yu et al. | 200/553 |
| 4,833,563 | A | * | 5/1989 | Russell | 361/92 |
| 4,858,056 | A | * | 8/1989 | Russell | 361/98 |
| 4,870,531 | A | * | 9/1989 | Danek | 361/93.1 |
| 4,884,048 | A | * | 11/1989 | Castonguay et al. | 335/18 |
| 4,894,631 | A | * | 1/1990 | Castonguay et al. | 335/167 |
| 4,939,490 | A | * | 7/1990 | Bernier et al. | 335/17 |
| 5,130,893 | A | * | 7/1992 | Straate et al. | 361/728 |
| 5,162,766 | A | * | 11/1992 | Morris et al. | 335/202 |
| 5,204,798 | A | * | 4/1993 | Scott | 361/93.3 |
| 5,241,290 | A | * | 8/1993 | Sehmer et al. | 335/202 |
| 5,303,113 | A | * | 4/1994 | Goleman et al. | 361/93.2 |
| 5,331,500 | A | * | 7/1994 | Corcoles et al. | 361/93.3 |
| 5,362,933 | A | * | 11/1994 | Kutsche et al. | 200/401 |
| 5,424,701 | A | * | 6/1995 | Castonguay et al. | 335/172 |
| 5,450,048 | A | * | 9/1995 | Leger et al. | 335/132 |
| 5,466,903 | A | * | 11/1995 | Faber et al. | 200/400 |
| 5,488,338 | A | * | 1/1996 | Seymour et al. | 335/202 |
| 5,502,286 | A | * | 3/1996 | Pollman et al. | 200/401 |
| 5,504,290 | A | * | 4/1996 | Baginski et al. | 200/401 |
| 5,534,833 | A | * | 7/1996 | Castonguay et al. | 335/68 |
| 5,539,168 | A | * | 7/1996 | Linzenich | 200/303 |
| 5,605,224 | A | * | 2/1997 | Seymour et al. | 200/401 |
| 5,605,467 | A | * | 2/1997 | Beck et al. | 439/148 |
| 5,706,153 | A | * | 1/1998 | Innes et al. | 361/31 |
| 5,841,616 | A | * | 11/1998 | Crosier | 361/102 |
| 5,921,380 | A | * | 7/1999 | Beck et al. | 200/307 |
| 6,084,188 | A | * | 7/2000 | Mueller et al. | 200/305 |
| 6,111,486 | A | * | 8/2000 | Fischer et al. | 335/42 |
| 6,188,036 | B1 | * | 2/2001 | Arnold | 218/157 |
| 6,191,947 | B1 | | 2/2001 | Titus et al. | |
| 6,366,188 | B1 | * | 4/2002 | Hein et al. | 335/202 |
| 6,388,213 | B1 | * | 5/2002 | Letient et al. | 200/43.15 |
| 6,421,217 | B1 | * | 7/2002 | Castonguay et al. | 361/115 |
| 6,437,262 | B1 | * | 8/2002 | Gupta et al. | 200/50.19 |
| 6,670,729 | B2 | * | 12/2003 | Novinsky et al. | 307/328 |
| 6,717,076 | B2 | * | 4/2004 | Narusevicius et al. | 200/50.24 |
| 6,836,396 | B1 | * | 12/2004 | Tignor et al. | 361/93.3 |
| 6,897,748 | B2 | * | 5/2005 | Yamagata et al. | 335/132 |
| 7,126,068 | B2 | * | 10/2006 | Fillppenko | 200/50.33 |
| 7,199,491 | B2 | * | 4/2007 | Novinsky et al. | 307/328 |
| 7,301,742 | B2 | * | 11/2007 | Tignor et al. | 361/93.3 |
| 7,592,888 | B2 | * | 9/2009 | Colsch et al. | 335/176 |
| 7,869,169 | B2 | * | 1/2011 | Davison et al. | 361/42 |
| 7,995,314 | B2 | * | 8/2011 | Titus | 361/42 |
| 2001/0025773 | A1 | * | 10/2001 | Rane et al. | 200/50.21 |
| 2008/0012666 | A1 | * | 1/2008 | Davison et al. | 335/18 |
| 2008/0150660 | A1 | * | 6/2008 | Birzer et al. | 335/106 |
| 2008/0237006 | A1 | * | 10/2008 | Bogdon et al. | 200/293 |
| 2009/0190289 | A1 | * | 7/2009 | Bellotto et al. | 361/620 |

FOREIGN PATENT DOCUMENTS

| | | | |
|---|---|---|---|
| RU | 2321916 | C2 | 4/2008 |
| WO | WO-03056594 | A1 | 7/2003 |
| WO | WO-2006/007608 | A2 | 1/2006 |
| WO | WO-2006/120147 | A1 | 11/2006 |

* cited by examiner

MEDIUM VOLTAGE CIRCUIT BREAKER WITH INTEGRATED ELECTRONIC PROTECTION UNIT

CROSS REFERENCE TO RELATED APPLICATIONS

This application is a National Phase filing under 35 U.S.C. §371 of PCT/EP2009/053005 filed on Mar. 13, 2009; and this application claims priority to Application No. 08154438.9 filed in Europe on Apr. 11, 2008 under 35 U.S.C. §119; the entire contents of all are hereby incorporated by reference.

The present invention relates to a medium voltage circuit breaker having an integrated electronic protection unit. For the purposes of the present application the term Medium Voltage is referred to applications in the range of between 1 and 52 kV.

Medium voltage circuit breakers constantly increase the use of integrated electronic devices to better control and enhance performances and reduce production costs. In particular, microprocessor-based controllers of power system equipment, the so-called Intelligent Electronic Devices (IED), are more and more used nowadays in the electric power industry.

At the present state of the art, Intelligent Electronic Devices with low complexity are integrated inside the circuit breaker frame as loose electronic module with several connectors and wires distributed along the electronic module boundary. The electronic module is coat with special coatings and resins to withstand the hostile environment (dusty, humidity, mechanical shocks) where the medium voltage circuit breaker is normally installed and operated. That adds inefficiency and costs during the production process of the electronic module increasing the risk of pre-damages of the electronic module which may reduce the long term reliability of the Intelligent Electronic Device.

Another critical issue is the cabling of the Intelligent Electronic Device inside the circuit breaker which is generally a difficult task requiring skilled personnel to assemble and test the circuit breaker during its production process. Moreover, the cabling operation is complex and time-consuming thereby negatively impacting the production costs of the circuit breaker.

Also, the maintenance of the circuit breaker, and in particular of the electronic part thereof, usually requires personnel with relatively high electronic expertise.

It is therefore an object of the present invention to provide a medium voltage circuit breaker in which the above-mentioned drawbacks are avoided or at least reduced.

More in particular, it is an object of the present invention to provide a medium voltage circuit breaker with protection and control function integrated directly onboard.

As a further object, the present invention is aimed at providing provide a medium voltage circuit breaker having an integrated electronic protection unit, in which the Intelligent Electronic Devices have a very compact design in terms of structure and dimensions.

A further object of the present invention is to provide a medium voltage circuit breaker with an integrated electronic protection unit having a relatively high immunity level to electromagnetic fields and disturbances.

Still a further object of the present invention is to provide a medium voltage circuit breaker with an integrated electronic protection unit that can be easily customized to meet the customer requirements.

Another object of the present invention is to provide a medium voltage circuit breaker with an integrated electronic protection in which the cabling and wiring operation are reduced at a minimum.

Another object of the present invention is to provide a medium voltage circuit breaker with an integrated electronic protection that can be easily maintained and serviced without having long out of orders periods of the medium voltage panel and without having high electronic expertise.

Still another object of the present invention is to provide a medium voltage circuit breaker with an integrated electronic protection with reduced manufacturing and installation costs.

Thus, the present invention relates to a Medium Voltage Circuit Breaker (CB) comprising an electronic protection and control unit which comprises a base, fixed to the circuit breaker, comprising a main body having fixing means for fixing to the circuit breaker, a first side of said main body comprising a confined space including connections to the circuit breaker and internal accessories thereof, a second side of said main body comprising a plurality of first power and/or signal connection means; the electronic protection and control unit also comprises a removable unit comprising a casing, a first part of said casing hosting one or more Intelligent Electronic Devices, a second part of said casing being removably coupled to said base and comprising a plurality of second power and/or signal connection means connected to said first power and/or signal connection means.

In other words, the medium voltage circuit breaker according to the invention is equipped with an electronic protection and control unit having a first part which is fixed to circuit breaker and that can be considered as a docking station; then a second part which contains all the electronic modules, CPUs, digital IO peripherals, power supply and local circuit breaker HMI signaling interface, is removably plugged to the docking station and can be considered as a plug-in unit containing a plurality of Intelligent Electronic Devices for circuit breaker protection and control.

In this way, it is possible to overcome some of the disadvantages and drawbacks of the medium voltage circuit breakers of the known art. In particular the protection and control functions are on-board the circuit breaker, thereby enhancing the performances and reducing the production costs. Also, thanks to the structure and design of the electronic protection unit the wiring and cabling operation are reduced at a minimum level.

Further characteristics and advantages of the invention will emerge from the description of preferred, but not exclusive embodiments of a medium voltage circuit breaker according to the invention, non-limiting examples of which are provided in the attached drawings, wherein.

Figure 1:
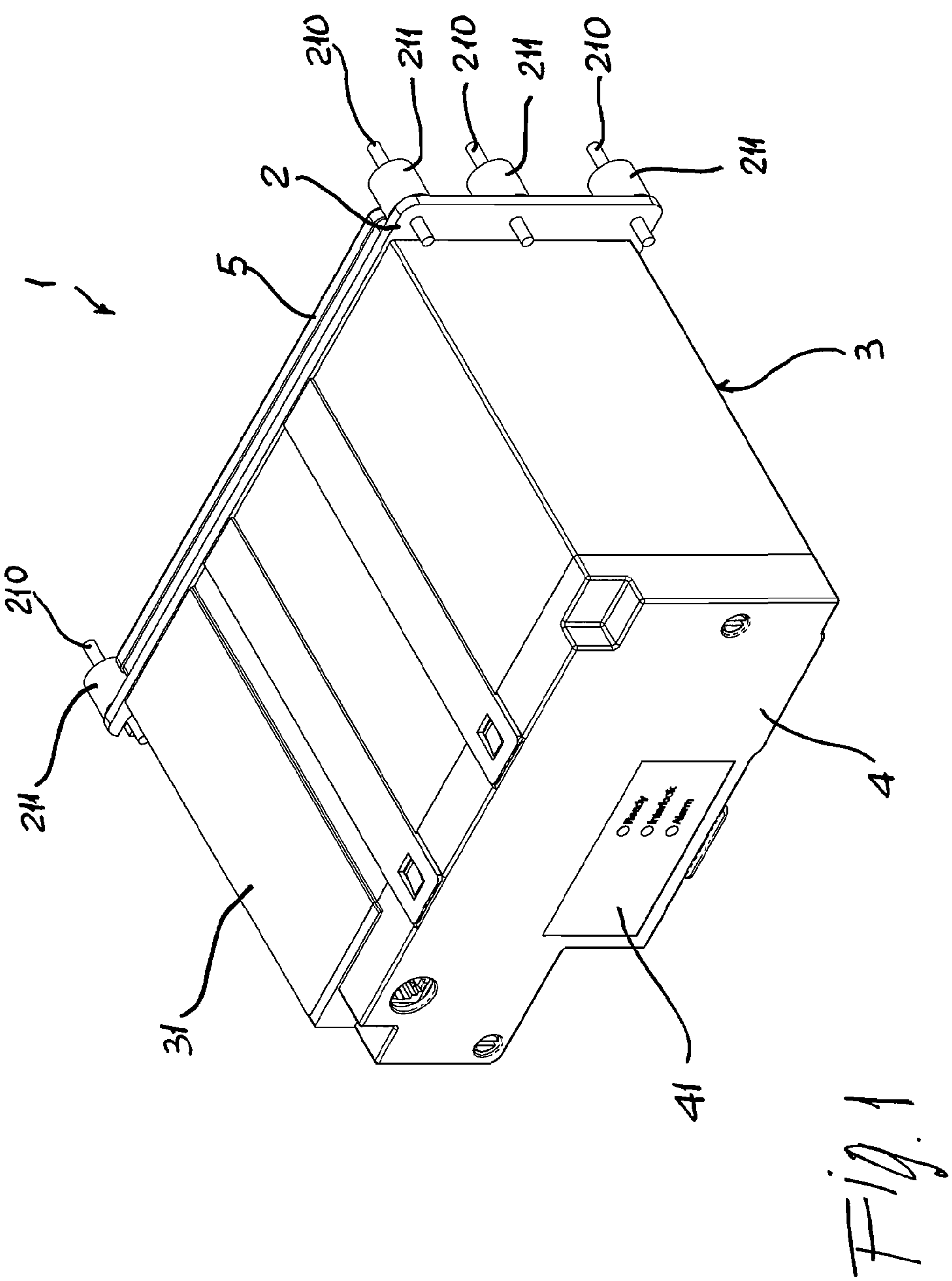
FIG. 1 is a perspective view of a first embodiment of an electronic protection unit used in a circuit breaker according to the invention.
Figure 2:
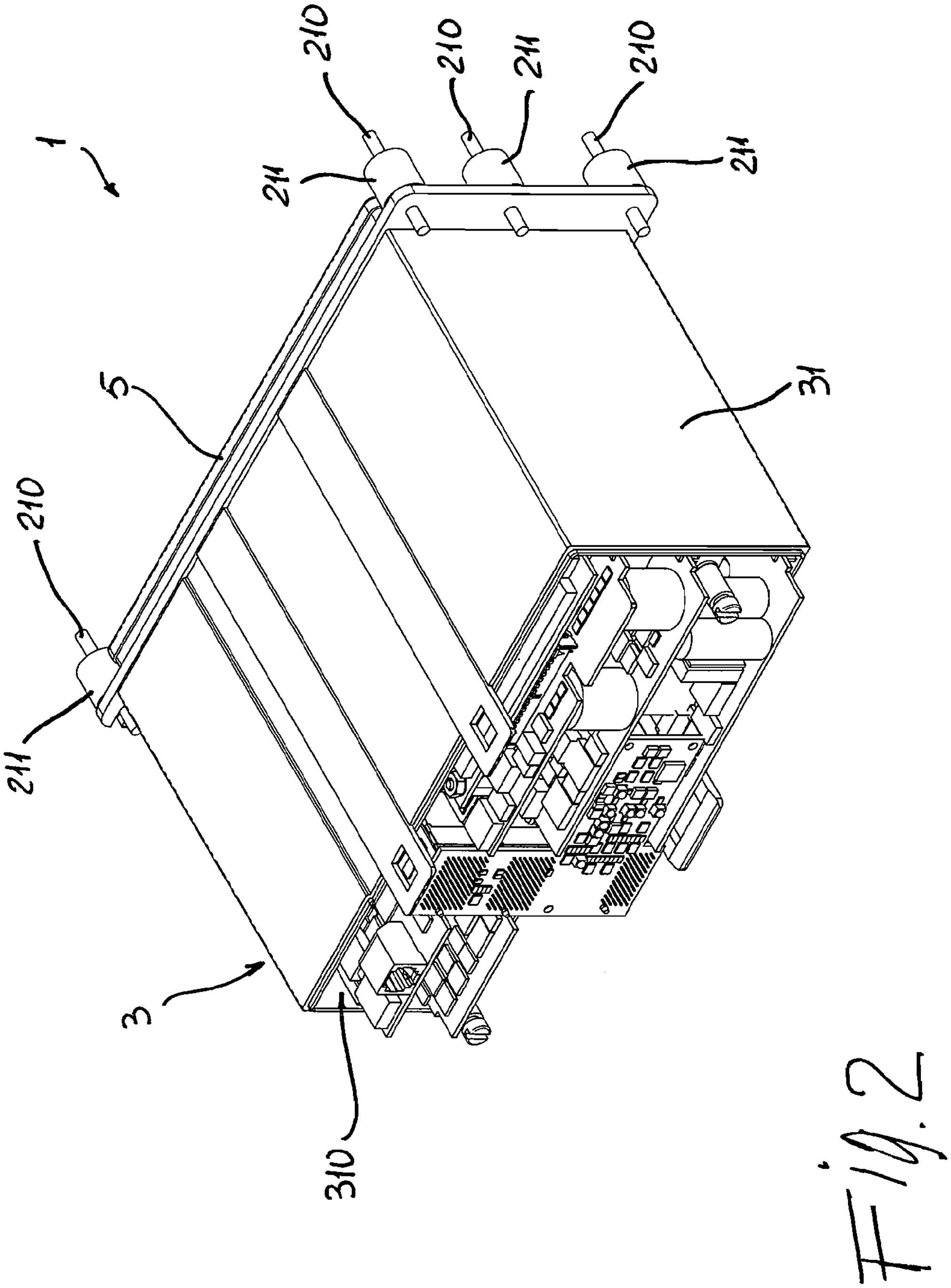
FIG. 2 is a perspective view of the electronic protection unit of FIG. 1, illustrated without front cover.
Figure 3:
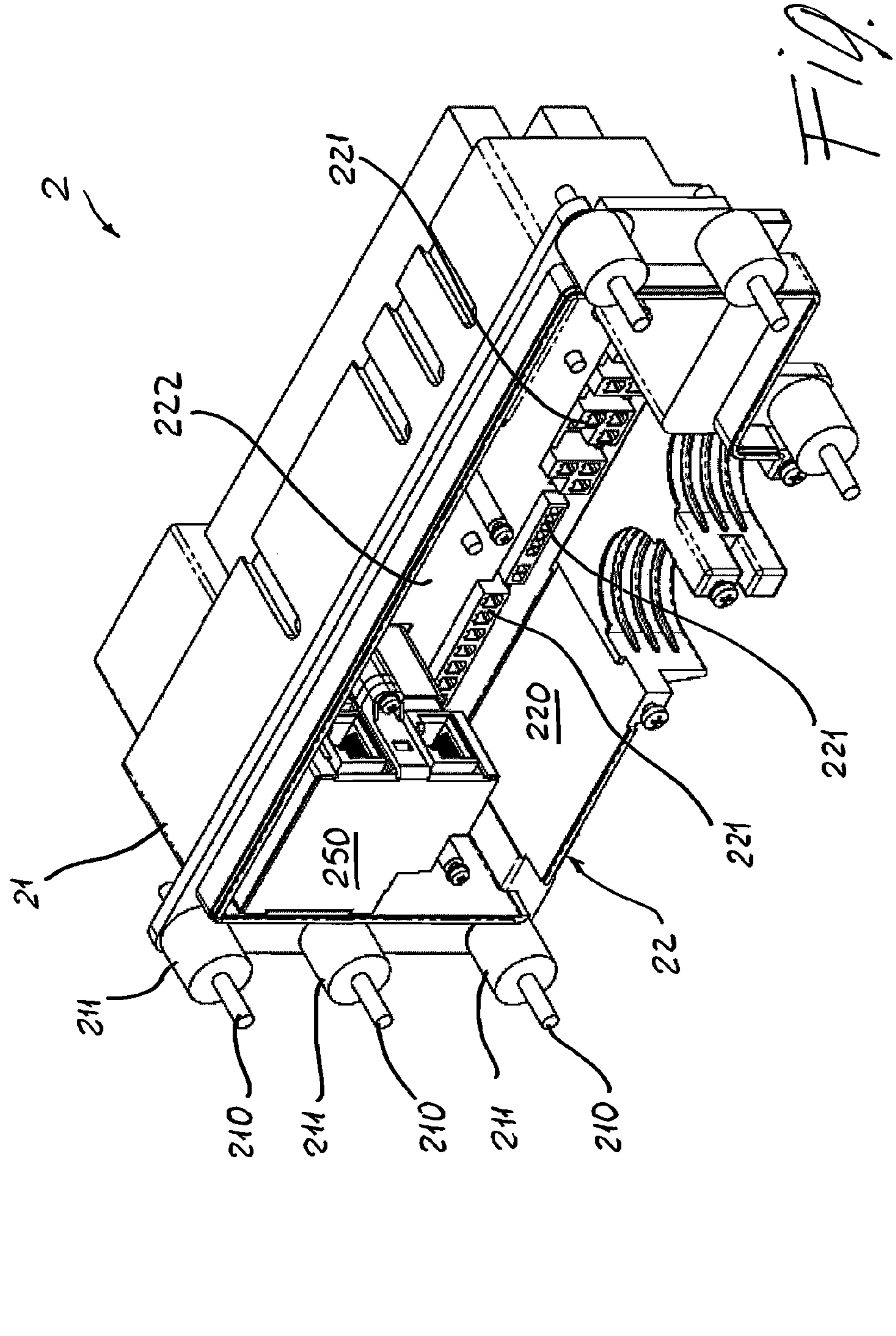
FIG. 3 is a perspective view of the rear part of the base of the electronic protection unit of FIG. 1.
Figure 4:
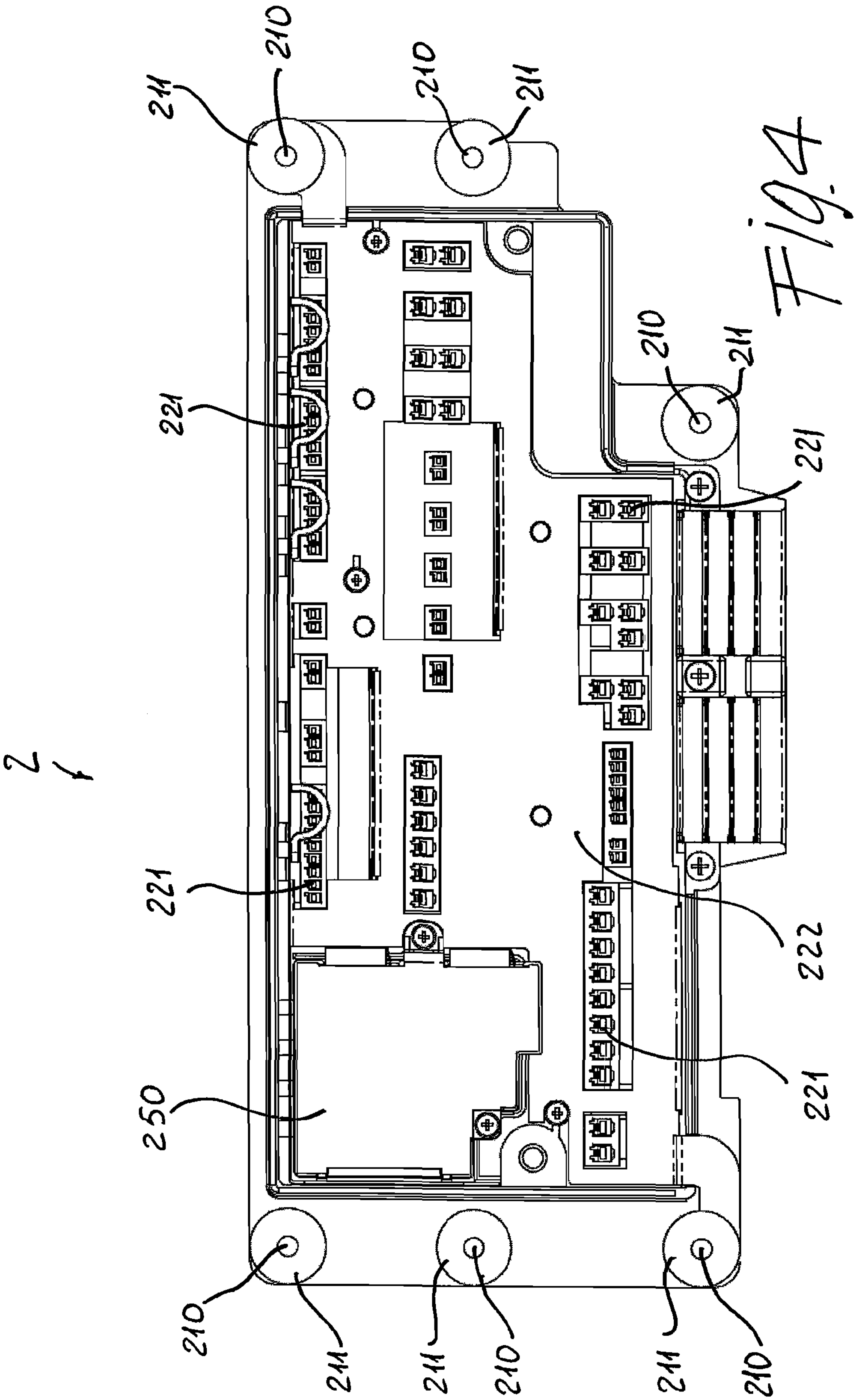
FIG. 4 is a plan view of the rear part of the base of the electronic protection unit of FIG. 3.
Figure 5:
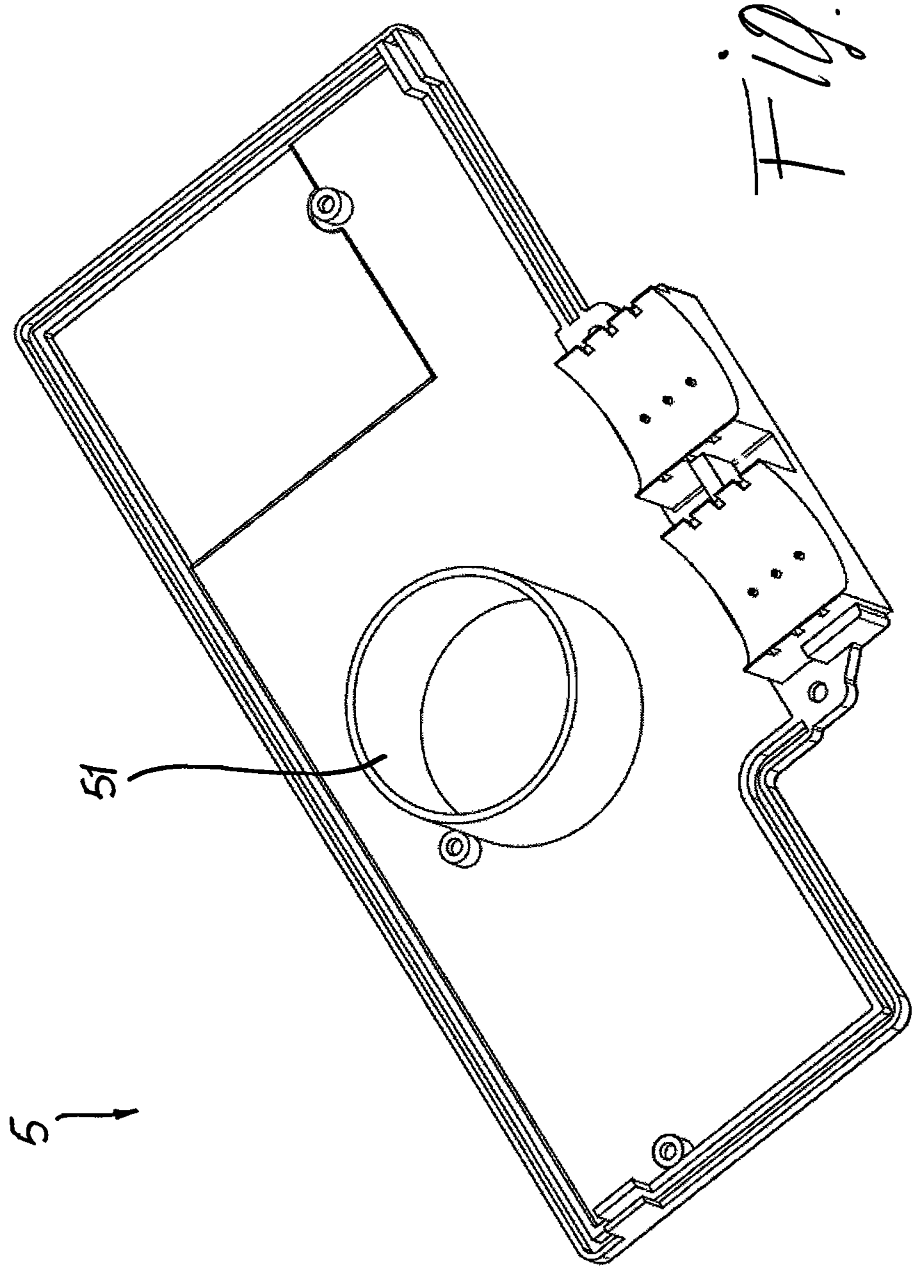
FIG. 5 is a perspective view of the back cover fixable to the rear part of the base of the electronic protection unit of FIG. 3-4.

With reference to the attached figures, a Medium Voltage Circuit Breaker (CB) according to the invention comprises an electronic protection and control unit, generally designated with the reference numeral 1. The electronic protection and control unit 1, in its more general definition, comprises a base 2 which, under operating conditions is fixed to the circuit breaker. The base 2, shown in details in FIGS. 3-7, comprises a main body 21 having fixing means 210 for fixing to the circuit breaker; the fixing means can be conventional means, e.g. screws and similar. According to a preferred embodiment, the base 2 is coupled to the circuit breaker using fixing means 210 that comprise appropriate shock absorbers 211. In this way the mechanical movements and vibrations generated by the circuit breaker during operation are not transmitted, or at least minimized, to the Intelligent Electronic Devices housed in the electronic protection and control unit.

A first side 22 of the main body 21 comprises a confined space 220 including connections 221 to the circuit breaker and internal accessories thereof. In other words, the rear part 22 of the base 2 under operating conditions is attached to the circuit breaker; said rear part 22 has a cavity 220 having into it a plurality of connection points 221 for the connections to the cables and wires coming from the circuit breaker and from the various accessories equipping it.

A second side 23 of the main body 21, opposite to the first side 22, comprises a plurality of first power and/or signal connection means 231. Thus, when the base 2 is placed and fixed to the circuit breaker, it can be considered as a docking station presenting a plurality of connections for accessing/exchanging signal and/or power with the circuit breaker.

Figure 8:
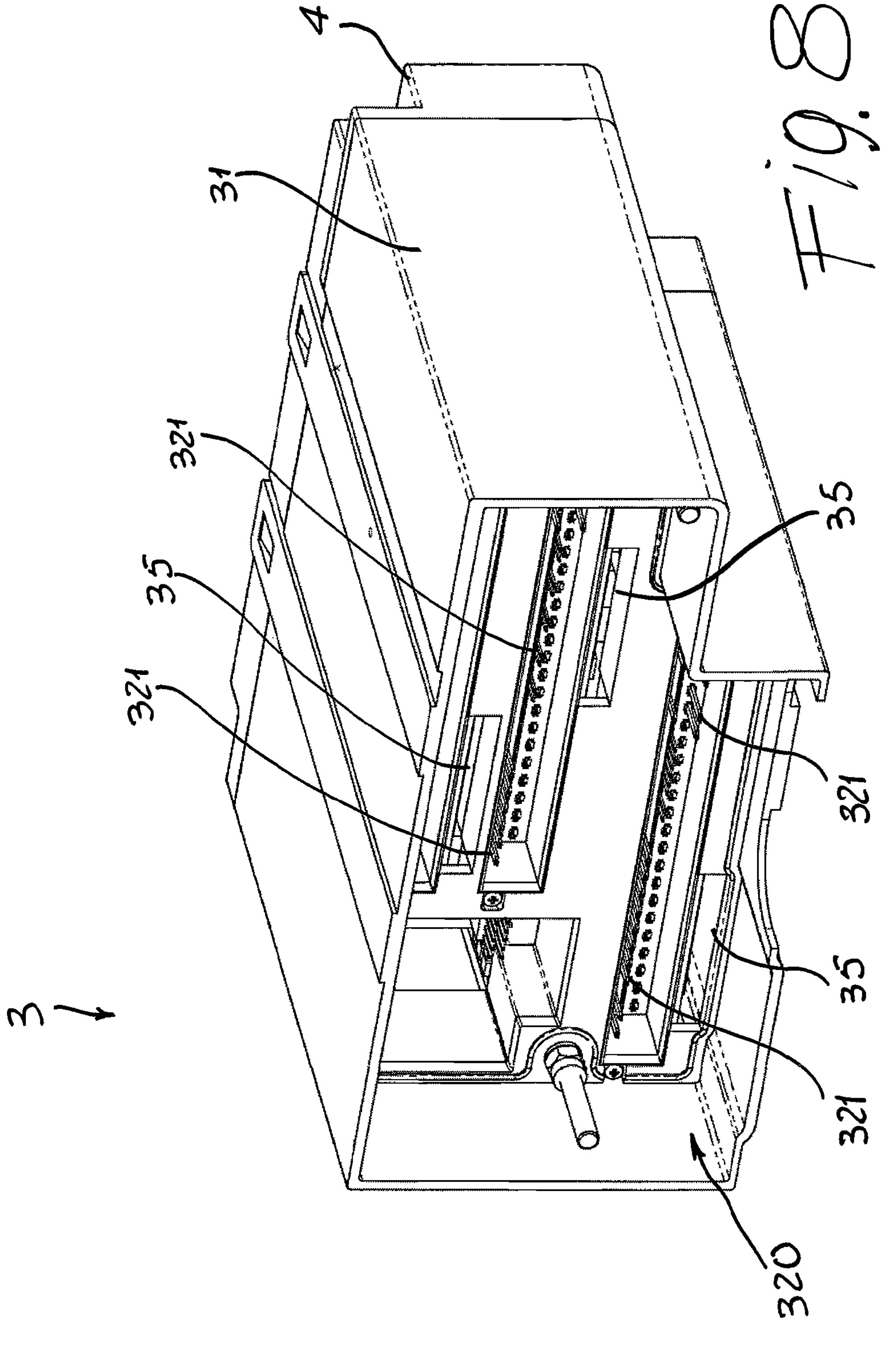
FIG. 8 is a perspective view of the rear part of the plug-in unit of the electronic protection unit of FIG. 1.
Figure 9:
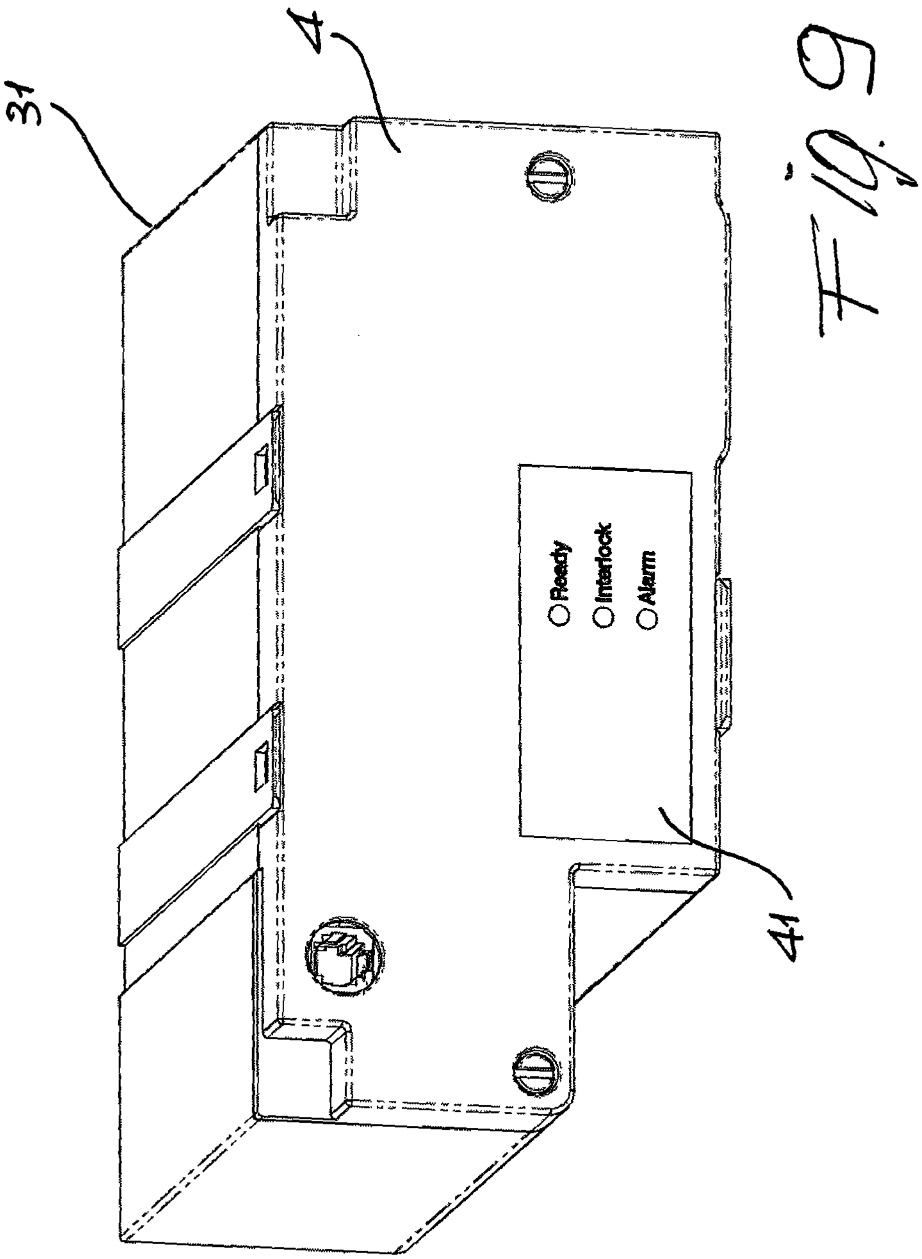
FIG. 9 is a perspective view of the front part of the plug-in unit of the electronic protection unit of FIG. 8.

The electronic protection and control unit also comprises a removable unit 3, shown in details in FIG. 8-9, comprising a casing 31. One or more Intelligent Electronic Devices are positioned inside the casing 31. In particular, the casing 31 has conveniently a box-like shape and comprises a first part 310 hosting said Intelligent Electronic Devices; a second part 320 of said casing 31 is removably coupled to said base 2 and comprises a plurality of second power and/or signal connection means 321 for connection to the first power and/or signal connection means 231 of the base 2. In other words, the removable unit 3 is a plug-in unit that can be easily connected to the base 2 (docking station).

Figure 6:
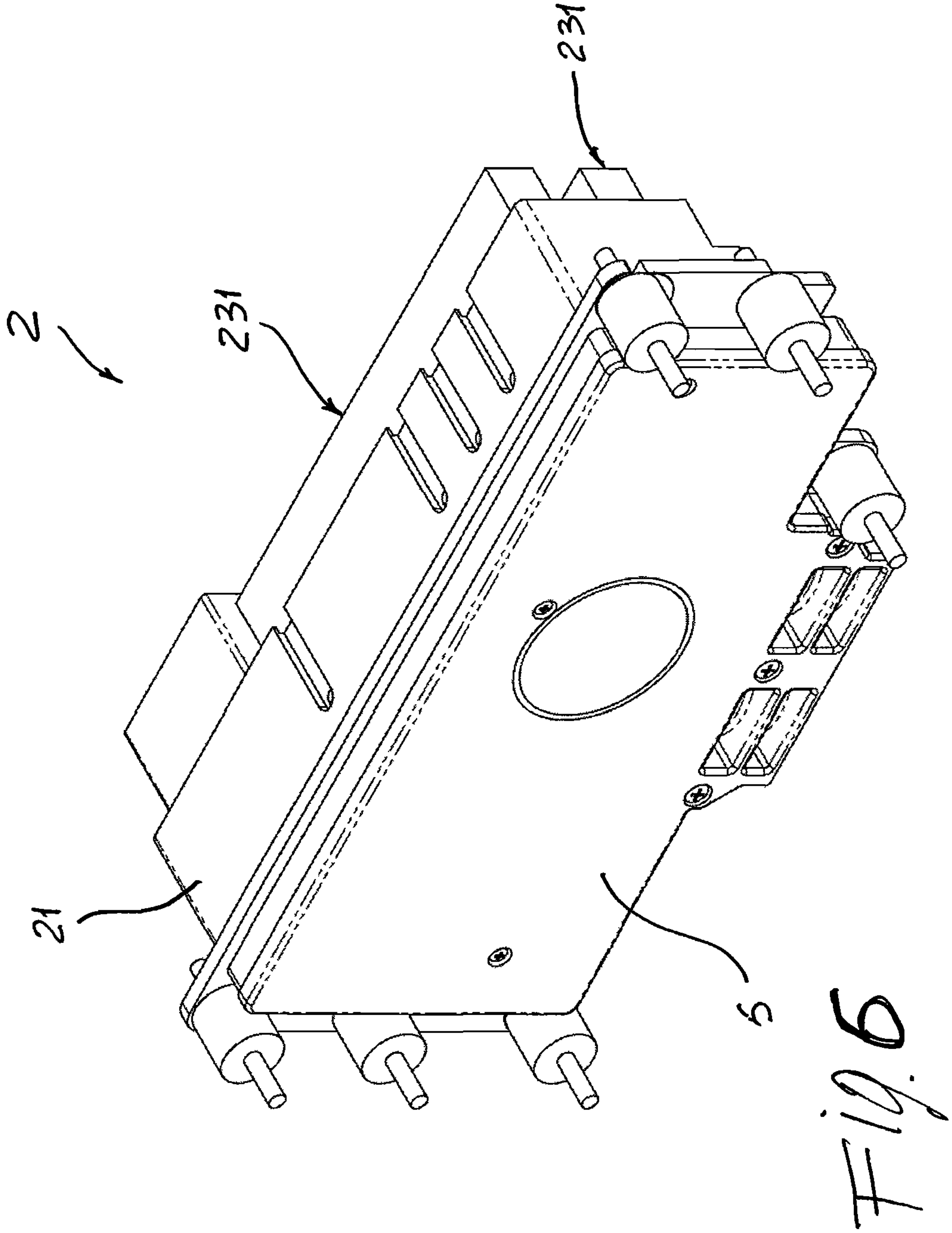
FIG. 6 is a perspective view of the rear part of the base of the electronic protection unit of FIG. 3-4 with the back cover of FIG. 5 mounted thereon.
Figure 7:
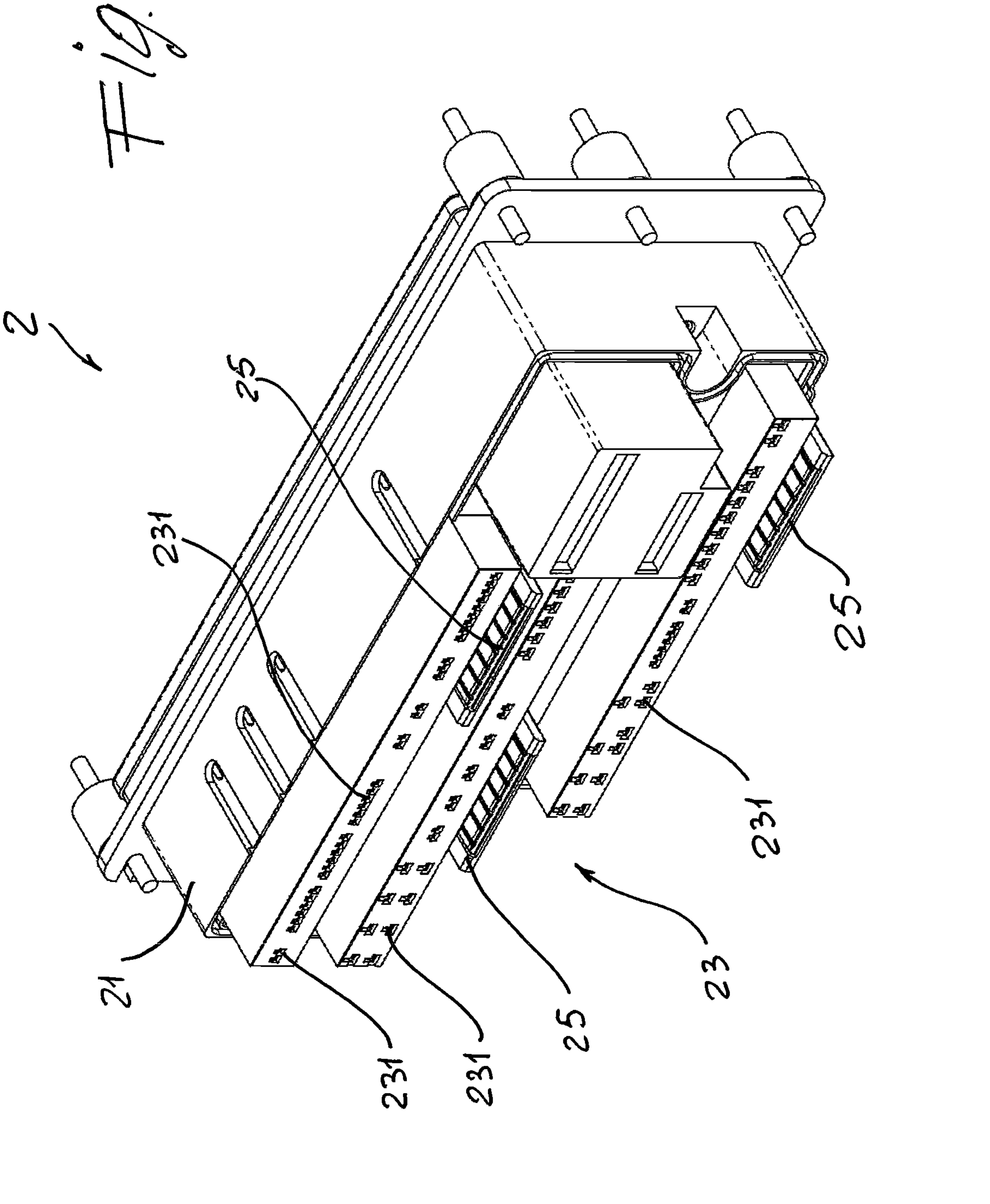
FIG. 7 is a perspective view of the front part of the base of the electronic protection unit of FIG. 3-6.

Preferably, as shown in FIGS. 1 and 6, the electronic protection and control unit 1 used in the circuit breaker according to the invention further comprises a first cover 4 which is associated with the first part 310 of the casing 31 of said removable unit 3, thereby constituting a front cover of the whole assembly.

Figure 10:
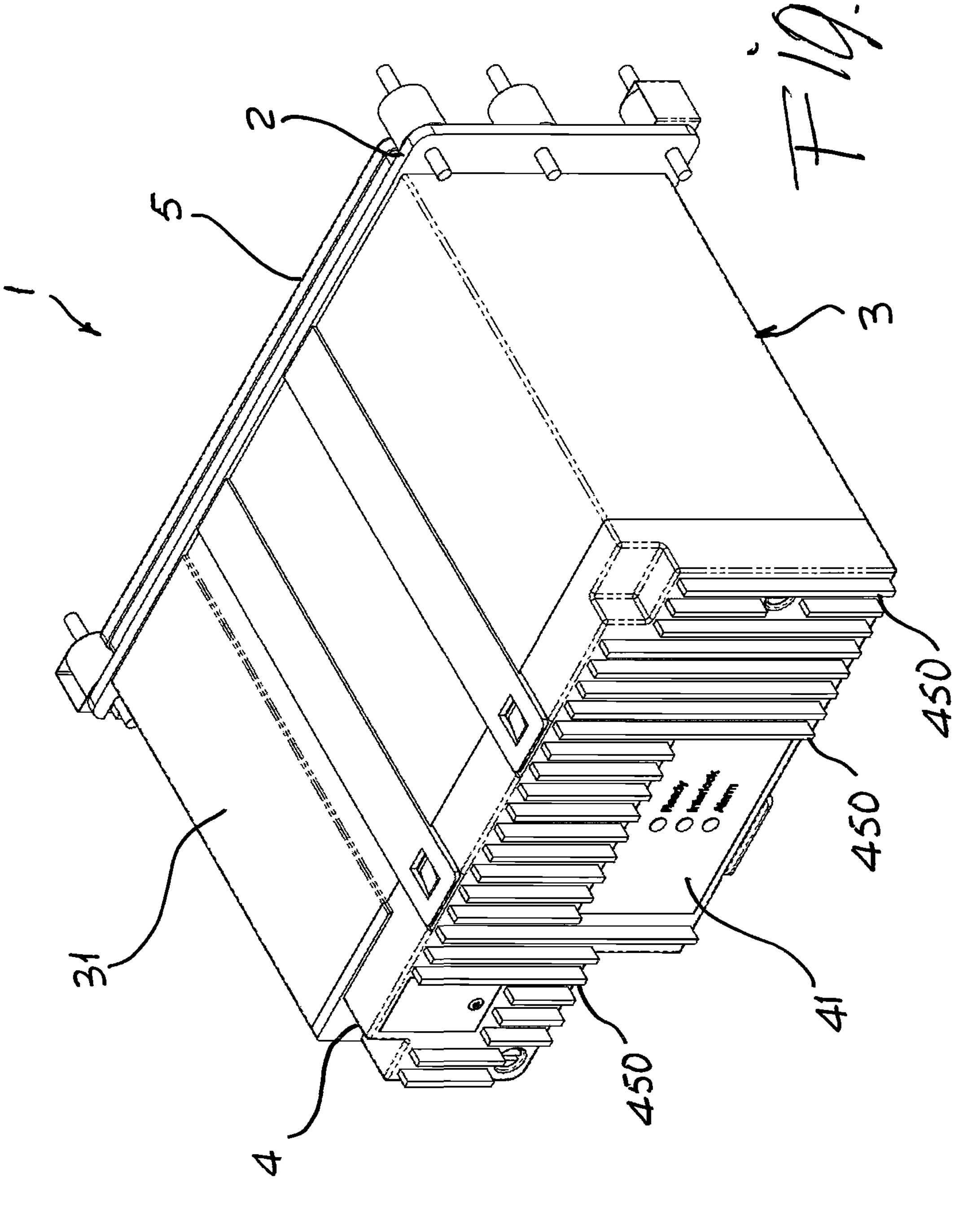
FIG. 10 is a perspective view of a particular embodiment of an electronic protection unit used in a circuit breaker according to the invention.

According to a preferred embodiment, illustrated in FIG. 10, the first cover 4 can conveniently comprise heat exchanging elements for dissipating the heat generated by the electronic equipment. For instance, as shown in FIG. 10, the first cover 4 can be made of a heat conducting material, e.g. aluminum and can comprise a number of ribs 450 (or similar heat exchanging elements) for increasing heat exchange efficiency. Also, one or more further heat exchanging elements, e.g. an aluminum plate, can be positioned below the first cover 4 and in contact with at least some hot electronic components, so as to help heat conduction from the inside to the outside.

The electronic protection and control unit also comprises a second cover 5 associated with the first side 22 of the main body 21 of said base 2. The second cover 5 is adapted to fit the rear part 22 of the base 2, leaving one or more passageways for cabling and wiring.

According to a preferred embodiment, the second cover 5 comprises a seat 51 for accommodating a ground fault secondary current transformer.

Advantageously, the bottom of the confined space 220 (i.e. the rear cavity) in said main body 21 comprises a metallic shield 222. In this way, it is possible to achieve a good shielding of the electronic modules contained in the removable unit 3 by electromagnetic disturbances conducted on the connected wires, thereby increasing the immunity level and reliability of the whole system.

The degree of shielding can be also increased by properly grounding the sheath of the shielded cables contained in the unit.

The contact between the shield element and the circuit breaker can be made through, e.g., copper strips.

Preferably, the base 2 also houses within the main body 21 a pluggable module 250, for instance a communication pluggable module.

In a particularly preferred embodiment of the Medium Voltage circuit breaker according to the present invention, the base 2 comprises one or more shield contact plates 25 that protrude from the second side 23 of said main body 21 for grounding said Intelligent Electronic Devices. Correspondingly, one or more seats 35 are defined in the second part 320 of the casing 31 of the removable unit 3 for the insertion of said shield contact plates 25. In this way, when the removable unit 3 is plugged to the base 2 the shield contact plates 25 enter into contact with the Intelligent Electronic Device(s) thereby allowing the grounding thereof.

The connection between the base 2 and the removable unit 3 can be achieved by using appropriate power and/or signal connection means. For instance, the first power and/or signal connection means 231 can comprise a plurality of connection holes, whereas the corresponding second power and/or signal connection means 321 can comprise a plurality of connection pins. In the circuit breaker according to the invention, the connections between the base 2 and the removable unit 3 normally comprise both power connection means and signal connection means.

Preferably, as shown in FIGS. 1 and 9, the first cover 4 of the removable unit 3 comprises local Human Machine Interface means 41 for said circuit breaker.

As it can be seen from the above description, the circuit breaker of the present invention has a number of advantages with respect to the circuit breaker equipped with conventional electronic modules. For instance, cables and main circuit breaker plug can be prepared and installed in the circuit breaker in early production phases, thereby allowing the preparation of the main circuit breaker parts without installing the most costly and delicate part that can be added only as final customization. It is also possible to have a high standardization of the wiring inside the circuit breaker and to main circuit breaker plug.

It is worth noting that the base 2 of the electronic protection and control unit can be used as main test plug during production routine test of the circuit breaker.

Among the advantages, it should be mentioned that the Intelligent Electronic Device(s) are enclosed in a protected and sealed environment. This allows avoiding conformal coating to protect electronic components from external chemical agents or conductive dust.

Also, the internal modules can be mounted according to the application demands without compromising the robustness of the Intelligent Electronic Device and requiring variants of the circuit breaker wiring. In addition, the Intelligent Electronic Devices can be easily substituted in case of malfunction without retesting of the whole functionality and connections of the circuit breaker.

As described above, the local Human Machine Interface is integrated on the Intelligent Electronic Device. This avoids the use of additional modules inside the circuit breaker removing additional communication ports.

A further interesting feature of the circuit breaker of the invention is that relevant circuit breaker information (e.g. sensor calibration factors, operation counters, contact wear) can be stored in a non-volatile memory accommodated in a dedicate slot inside the base 2 of the electronic protection and control unit; in case of substitution of the removable unit 3 this information is not lost and the circuit breaker does not need to be reconfigured.

The medium voltage circuit breaker and the electronic protection and control unit thus conceived may undergo numerous modifications and come in several variants, all coming within the scope of the inventive concept. Moreover, all the component parts described herein may be substituted by other, technically equivalent elements. In practice, the component materials and dimensions of the device may be of any nature, according to need and the state of the art.

The invention claimed is:

1. A Medium Voltage Circuit Breaker ("CB") comprising an electronic protection and control unit wherein said electronic protection and control unit comprises:

a base, fixed to the circuit breaker, comprising a main body having fixing means for fixing to the circuit breaker, a first side of said main body comprising a confined space including connections to the CB and internal accessories thereof, a second side of said main body comprising a plurality of first power and/or signal connection means;

the first side of the main body forming the rear part of the base;

the second side of the main body forming a part of the base that is opposite to the rear part of the base;

a removable unit comprising a casing, a first part of said casing hosting one or more Intelligent Electronic Devices, a second part of said casing being removably coupled to said base at the second side of the main body and comprising a plurality of second power and/or signal connection means connected to said first power and/or signal connection means; wherein said electronic protection and control unit further comprises:

a first cover fixed to the first part of the casing of said removable unit, the first cover forming a front cover of the assembly including the base and the removeable unit; and a second cover associated with the first side of the main body of said base, the second cover mounted on the rear part of the base.

2. The Medium Voltage Circuit Breaker according to claim 1, wherein said second cover comprises a seat for accommodating a ground fault secondary current transformer.

3. The Medium Voltage Circuit Breaker according to claim 2, wherein said fixing means comprises shock absorbers.

4. The Medium Voltage Circuit Breaker claim 2, wherein the bottom of said confined space in said main body comprises a metallic shield.

5. The Medium Voltage Circuit Breaker claim 2, wherein said main body houses a communication pluggable module.

6. The Medium Voltage Circuit Breaker according to claim 1, wherein said fixing means comprises shock absorbers.

7. The Medium Voltage Circuit Breaker claim 6, wherein the bottom of said confined space in said main body comprises a metallic shield.

8. The Medium Voltage Circuit Breaker claim 6, wherein said main body houses a communication pluggable module.

9. The Medium Voltage Circuit Breaker claim 1, wherein the bottom of said confined space in said main body comprises a metallic shield.

10. The Medium Voltage Circuit Breaker claim 1, wherein said main body houses a communication pluggable module.

11. The Medium Voltage Circuit Breaker claim 1, wherein said base comprises one or more shield contact plates protruding from the second side of said main body for grounding said Intelligent Electronic Devices.

12. The Medium Voltage Circuit Breaker according to claim 11, wherein one or more seats are defined in the second part of said casing for the insertion of said shield contact plates.

13. The Medium Voltage Circuit Breaker claim 1, wherein said first power and/or signal connection means comprise a plurality of connection holes.

14. The Medium Voltage Circuit Breaker according to claim 13, wherein said second power and/or signal connection means comprise a plurality of connection pins.

15. The Medium Voltage Circuit Breaker according to claim 1, wherein said first cover comprises local Human Machine Interface means for said Circuit Breaker.

16. The Medium Voltage Circuit Breaker according to claim 1, wherein said first cover comprises heat exchanging elements.

17. The Medium Voltage Circuit Breaker according to claim 1, wherein said fixing means comprises shock absorbers.

18. The Medium Voltage Circuit Breaker claim 1, wherein the bottom of said confined space in said main body comprises a metallic shield.

19. The Medium Voltage Circuit Breaker claim 1, wherein said main body houses a communication pluggable module.

* * * * *